United States Patent [19]

Sugano et al.

[11] Patent Number: 5,548,414
[45] Date of Patent: Aug. 20, 1996

[54] IMAGE DATA INPUT APPARATUS

[75] Inventors: Masashi Sugano; Kenichi Matsuo, both of Hachioji, Japan

[73] Assignee: Konica Corporation, Tokyo, Japan

[21] Appl. No.: 129,327

[22] Filed: Sep. 30, 1993

[30] Foreign Application Priority Data

Oct. 13, 1992 [JP] Japan .................... 4-274157

[51] Int. Cl.$^6$ .............................. H04N 1/04; H04N 1/387
[52] U.S. Cl. ........................ 358/452; 358/453; 358/488
[58] Field of Search .................... 358/452, 453, 358/449, 488, 497; 345/158, 177; 178/18; 355/218, 230, 231, 235

[56] References Cited

U.S. PATENT DOCUMENTS

| | | | |
|---|---|---|---|
| 4,317,005 | 2/1982 | de Bruyne | 355/218 |
| 4,700,176 | 10/1987 | Adler | 345/177 |
| 4,799,080 | 1/1989 | Fujiwara | 178/18 |
| 5,177,327 | 1/1993 | Knowles | 345/177 |

*Primary Examiner*—Scott A. Rogers
*Attorney, Agent, or Firm*—Finnegan, Henderson, Farabow, Garrett & Dunner, L.L.P.

[57] ABSTRACT

An input device, in use with a copier, for inputting image editing information corresponding to an image on a document. The device includes a platen glass having a transparent body; a scanner for scanning the image of the document through the transparent body of the platen glass; a printer for duplicating the image of the document, which is scanned by the scanner, onto a recording sheet; and an input touch panel for inputting the image editing information corresponding to the image. The input device includes a detector for detecting a pressing force toward the input touch panel and a location of operation of the input touch panel by the operator in which the input touch panel is equipped on the transparent body of the platen glass.

10 Claims, 6 Drawing Sheets

IMAGE DATA INPUT APPARATUS

BACKGROUND OF THE INVENTION

The present invention relates to an image input apparatus which can effectively detect various commands on a platen glass.

In some image input apparatuses such as a copier, a touch-panel is formed on the upper surface of a platen cover and an edit function is provided in the panel. In this type of apparatus, the platen cover is closed, a document is placed on the platen cover and then, the edit function is used. After the edit function has been used, the document is placed again on the platen glass and an image input operation is carried out.

The touch-panel of the editor for this kind of input apparatus is an electrostatic capacitance type panel. For an operational unit, generally, a resistance film type touch-panel is most frequently used.

The electrostatic capacitance type touch panel operators as follows: a finger contact point on the surface of the glass, on which conductive films are evaporated, is detected by a weak current flowing from sensors provided on four corners of the glass surface at the contact point. However, the following problem occurs: the value of the electrostatic capacitance differs depending on each human user therefore some corrections are necessary.

The resistance film type touch-panel operates as follows: a transparent conductive thin film formed on the glass surface or a polyester film forms an electrode, and a voltage drop on the surface of the electrode provides the position detection.

Further, in some cases, an optical method is used for the touch-panel. In this method, position detection is provided when light rays (infrared rays) between a pair of light emitting/light receiving diodes are interrupted by fingers or the like. In this method, an exclusive frame for diode mounting is necessary. Further, since light rays pass several centimeters above the surface of the touch panel, a direction signal is input to the sensor before fingers touch the panel. This creates a problem, because the operation can not be smoothly carried out.

In the apparatus with the foregoing editor, the document is placed on the platen cover, a position and area of the document is input the platen cover is opened, the document is placed on the platen glass, and a document image is input to the apparatus. Accordingly, this operation is troublesome.

Further, an automatic document feeder (ADF) can not be used together with the editor of the apparatus. Therefore, when the automatic document feeder is used in the apparatus, the editor must be provided separately from the apparatus. Accordingly, the poor space efficiency creates a problem.

The object of the present invention is to solve the foregoing problems, and to realize an image input apparatus which can give various commands from the surface of the platen glass.

SUMMARY OF THE INVENTION

The foregoing problems are solved by the first embodiment of the present invention which is an input device, for use with a copier, for inputting image editing information corresponding to an image on a document. The device includes a platen glass having a transparent body; a scanner for scanning the image of the document through the transparent body of the platen glass; and an input touch panel for inputting the image editing information corresponding to the image. The input device includes a detector for detecting a location on the input touch panel indicated by the operator. The input touch panel is equipped on the transparent body of the platen glass.

The input device according to the first embodiment mentioned above is further characterized in that the detector includes: plural reflection slits provided outside an effective image reading area on the platen glass; a generator for generating an oscillation signal toward the plural reflection slits; a receiver for receiving the oscillation signal reflected by the plural reflection slits, and for generating a receiving signal; and a determining circuit for determining the indicated location according to the receiving signal, and for generating a positioning signal which designates the location indicated by the operator.

The input device mentioned above is also characterized in that the oscillation signal is an ultrasonic wave.

The input device mentioned above also includes an image data processor for processing image data read by the scanner according to the positioning signal.

The input device mentioned above further includes a printer for forming an image on a sheet according to the image data processed by the image data processor.

The input device mentioned above further includes a printer for forming an image on a sheet according to the positioning signal.

The input device mentioned above further includes a determination circuit for determining a pressing force on the input touch panel according to the receiving signal, and for generating a pressing force signal which designates the pressing force of the operator.

The foregoing problems are also solved by the second embodiment of the present invention which is an input device, for use with a copier, for inputting image editing information corresponding to an image on a document. The device includes: a platen glass having a transparent body; a scanner for scanning the image of the document through the transparent body of the platen glass; plural reflection slits provided outside an effective image reading area on the platen glass; a generator for generating an oscillation signal toward the plural reflection slits; a receiver for receiving the oscillation signal reflected by the plural reflection slits, and for generating a receiving signal; and a determining circuit for determining the indicated location according to the receiving signal, and for generating a positioning signal which designates the location indicated by the operator.

The input device mentioned above is further characterized in that the oscillation signal is an ultrasonic wave.

The input device mentioned above further includes a sensor for recognizing an occurrence of the document on the platen glass according to the positioning signal, and for generating an occurrence signal.

The input device mentioned above further includes a display for displaying the occurrence of the document according to the occurrence signal.

The input device mentioned above further includes: a cover for covering the document on the platen glass; a sensor for detecting a contact of the cover with the platen glass according to the receiving signal, and for generating a detection signal; and a determination circuit for determining a size of the document according to the detection signal.

DETAILED DESCRIPTION OF THE INVENTION

Figure 1:
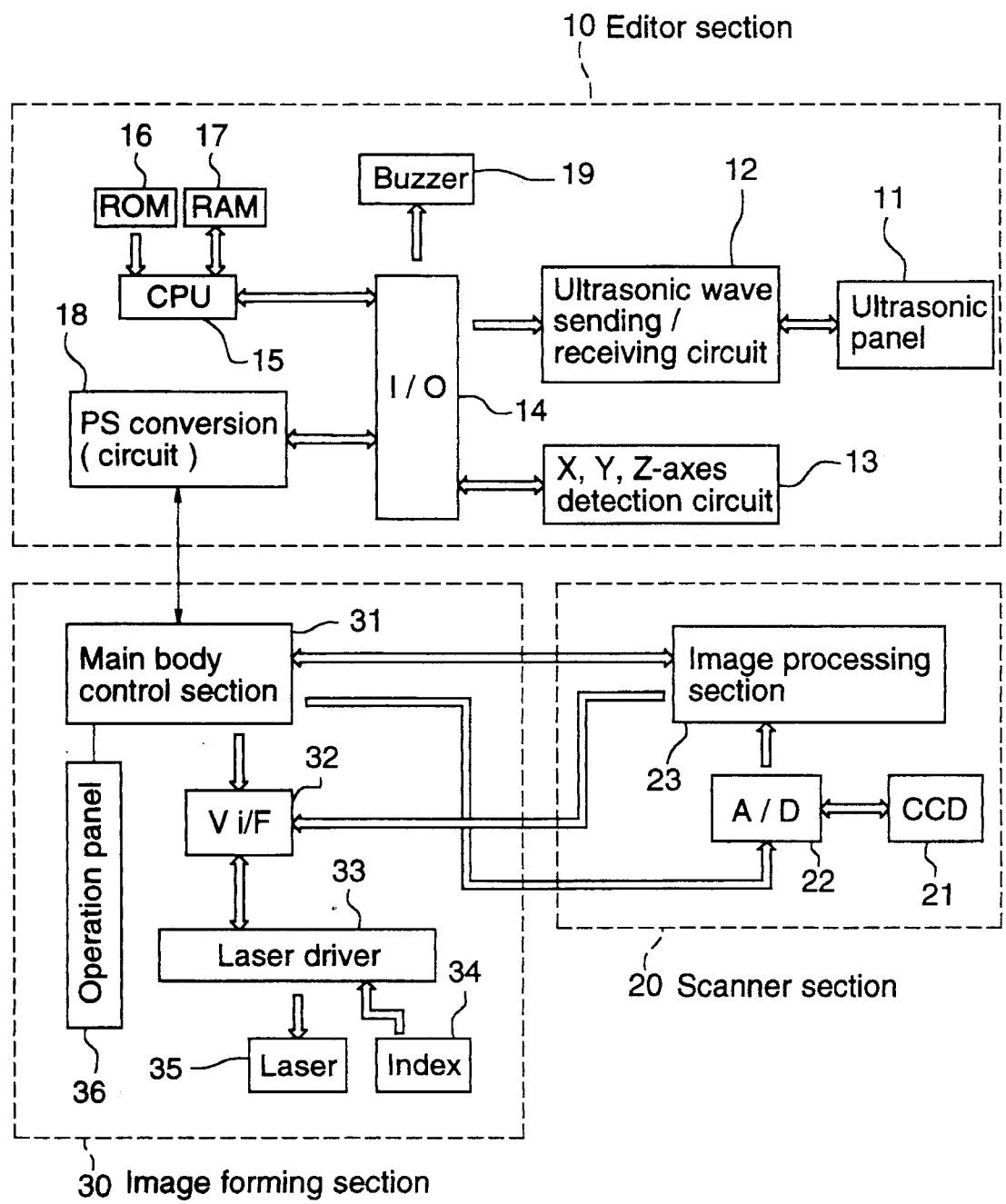
FIG. 1 as a view showing the entire structure of the first embodiment of the present invention.

Referring to the drawings, embodiments of the present invention will be described in detail as follows.

FIG. 1 is a view showing the entire structure of an embodiment of the present invention. In the drawing, an apparatus of the present invention can be divided into an editor section 10, a scanner section 20 and an image forming section 30. The outline structure shown in the drawing will be explained as follows.

In the editor section 10, designation of a position is given from an ultrasonic touch panel 11 which functions not only as a platen glass but also as an image input apparatus. The ultrasonic touch panel 11 is driven by an ultrasonic receiving circuit 12. A position in the directions of X and Y-axes, and a pressing force in the direction of Z-axis are detected by a detection circuit 13. The detection result is sent to a CPU 15 through an I/O 14. The CPU 15 uses a RAM 17 as a main memory according to a control program stored in a ROM 16 and makes a calculation. The calculation result is PS-converted by a PS-conversion section 18, and sent to the image forming section 30 as editor information.

In the PS-conversion section, a parallel signal in the editor section is converted into a serial signal for use in the main body, or the reverse processing is conducted.

In the scanner section 20, a CCD sensor 21 reads an image, and the image is photoelectrically converted. An A/D converter 22 converts image information into a digital signal, and the signal is image-processed in an image processing section 23.

Then, image data and editor information are collected in a main body control section 31, given to a laser driver 33 through a video-interface (VIF) 32, a laser diode 35 is driven by the laser driver 33 and image formation is conducted. Control of the entire operation is carried out according to a direction given from an operation panel 36.

Figure 2:
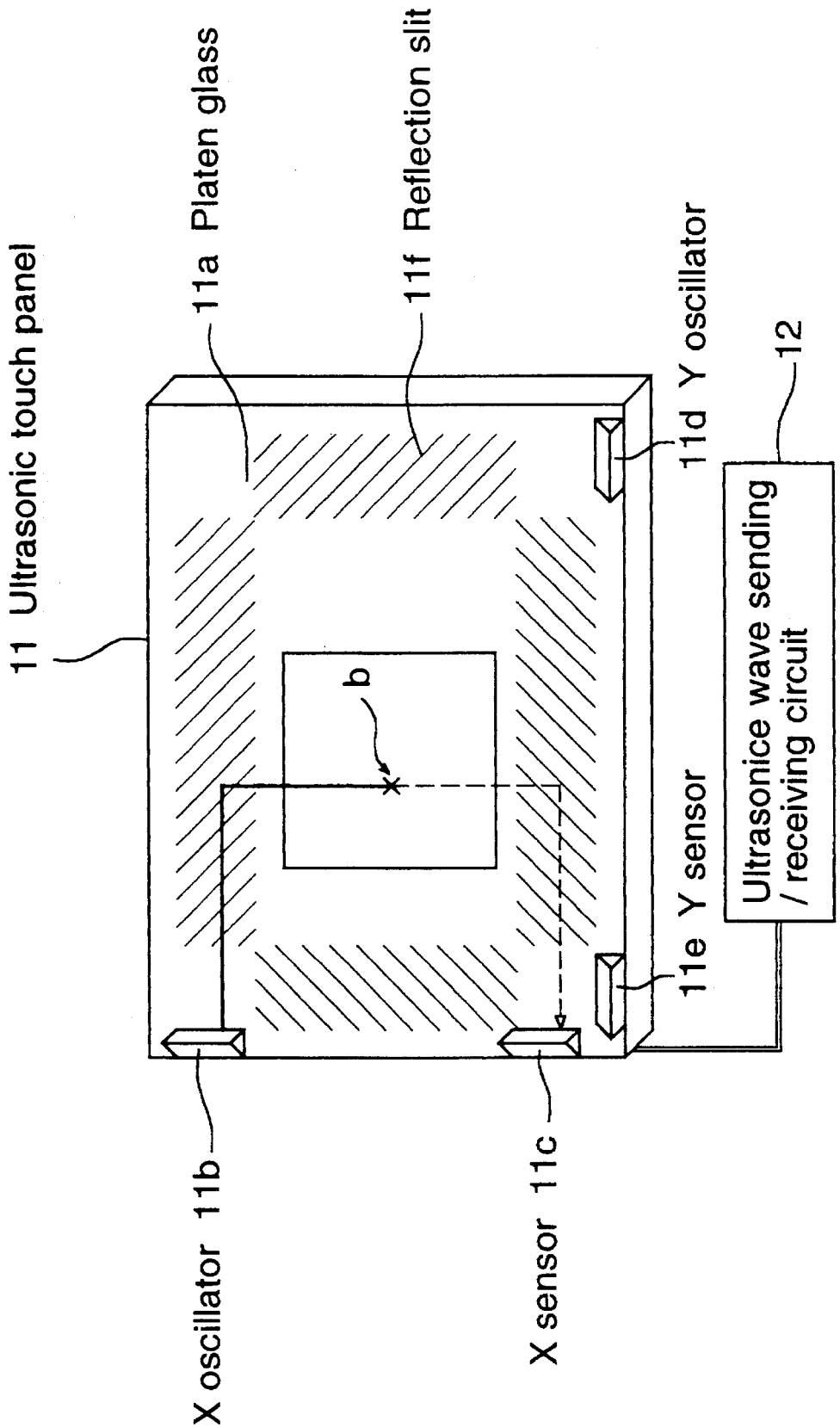
FIG. 2 is a waveform view explaining operations of the first embodiment of the present invention.

Referring to FIG. 2, an ultrasonic touch panel 11 will be explained as follows. The ultrasonic touch panel 11 comprises: a platen glass 11a having plurality of reflection slits formed of powders of baked glass arranged in four corners; and piezoelectric transducers arranged in the four corners of the platen glass 11a (an X oscillator 11b, an X sensor 11c, a Y oscillator 11d, a Y sensor 11e).

The platen glass is a transparent body of the supporting means of the document.

When an electric signal is given to the X oscillator 11b from an ultrasonic wave sending/receiving circuit 12, an ultrasonic oscillation is generated, and propagated on the panel surface of the platen glass 11a as SAW (surface acoustic wave). The SAW is reflected by right angles by a predetermined ratio (for example, 0.2%) at every time when the SAW is incident on a plurality of reflection slits. Then, the SAW crosses the panel surface and is further reflected by a plurality of reflection slits provided at the other side of the panel surface. After that, the reflected SAW is received by the X sensor 11c, and converted into an electric signal in the ultrasonic wave sending/receiving circuit 12.

As described above, reflection slits are provided with an angle to reflect the SAW, which advances in a direction perpendicular to the X-axis, in a direction perpendicular to the Y-axis, and the SAW, which advances in a direction perpendicular to the Y-axis, in a direction perpendicular to the X-axis.

The reflection slits are provided outside of an effective image reading area on the platen glass, that is, outside of the maximum document area so that all documents can be detected.

The situation is the same in the case of the ultrasonic oscillator.

Figure 3:
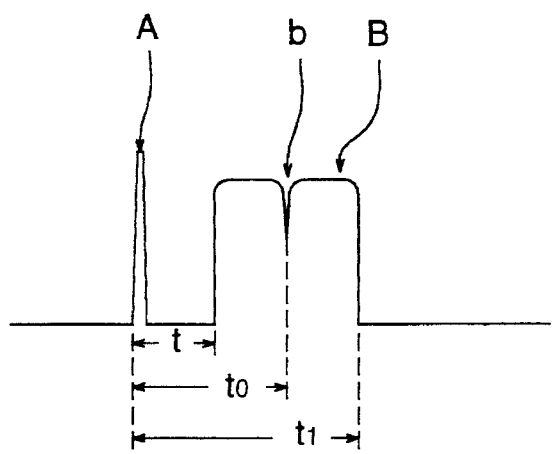
FIG. 3 as a waveform view explaining operations of the first embodiment of the present invention.

The sending and receiving waves as a function of time are shown in FIG. 3. Here, A shows the sending pulse, and B shows a resultant wave of pulses reflected by reflection slits. A recessed portion 'b' of the wave form B is a portion in which the panel surface is touched and the SAW is attenuated. For example, 'b' in FIG. 2 is touched by an elastic body, and the SAW in that portion is attenuated. Here, 't' means a time in which the reflected wave returns from a place at the shortest distance, 't0' means a time in which the reflected wave in the attenuated portion returns, and 't1' means a time in which the reflected wave returns from a place at the longest distance. The position of the touched portion can be obtained when the time, in which the reflected wave at the attenuated portion returns, is obtained by an XYZ-axes detection circuit in both the X-axis and Y-axis. The XYZ-axes detection circuit 13 can also obtain a pressing force in the direction of the Z-axis by a ratio of an amplitude of the waveform B to an amplitude of the recessed portion. It is necessary for the pressing member to absorb the SAW at the time of pressing. For example, fingers, rubber, droplets of liquid, and other soft members are available. Rubber of the hardness of 55 to 80 degrees, or a pen-shaped member, the hardness of the tip of which is 55 to 80 degrees, is preferably used. In an experiment, the coordinate of the touched portion was detected when a pressing force of more than 2 kgf was provided by a pressing member with a diameter of $\phi$10 and hardness between 50°–80°(Asuka C Scale) when a sheet of regular paper (55 kg sheet) was placed on the ultrasonic panel 11. Although the smaller the diameter of the pressing member is, the lower the detectability is, detectability can be maintained to be constant when the length of each slit is shortened, or the gap between slits is made narrow and ultrasonic output power is increased.

The Aska C test is for testing an hardness of the object. The Asuka C test is executed with the instrument shown in FIG. 10, and regulated by the regulations shown in Table A. For the test, the instrument is applied to the object until the object is in contact with the pressure surface, and the indicator is read. Since the pressure needle of the instrument is protruded 2.54 mm from the pressure surface, if the object has an elasticity not less than the maximum elasticity of the test, the needle is pushed into the instrument completely by the object so that the indicator indicates 100°. Otherwise, the indicator displays the hardness of the object according to the elasticity of the object with a number between 0° and 100°.

TABLE A

Figure 10:
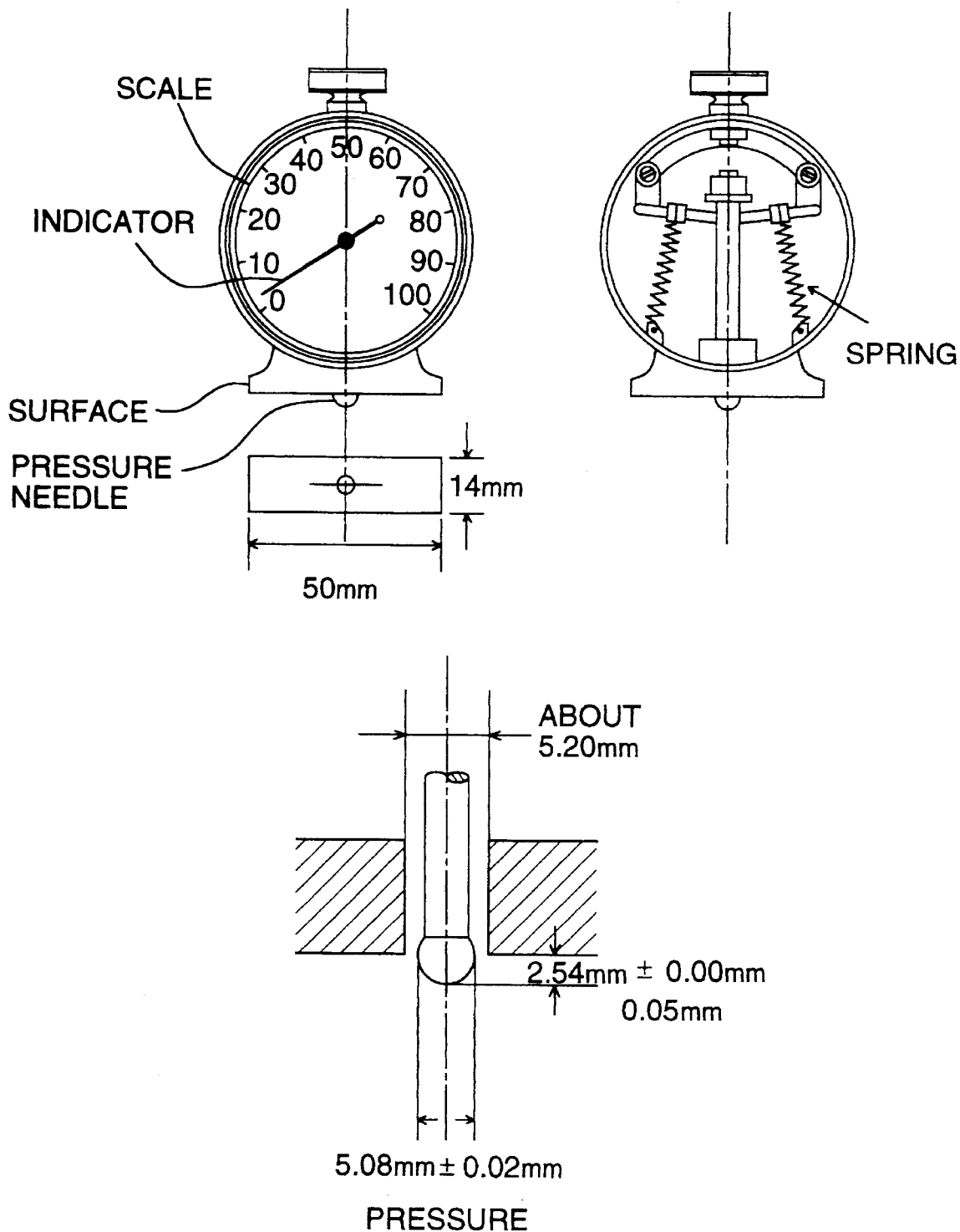
FIG. 10 is an illustration explaining operations of the Asuka C test for testing the hardness of an object.

| TEST | NEEDLE SIZE | | SPRING LOAD | |
| --- | --- | --- | --- | --- |
| | MAXIMUM HEIGHT | FIGURE OF NEEDLE | AT 0° | AT 100° |
| ASKA C | 2.54 mm | FIG. 10 | 55 g | 855 g |

Here, operations of the apparatus in the example will be described in detail as follows.

When the document is placed on the ultrasonic panel 11, which is used also for the platen glass, and a direction to read the document is given from an operation panel 36, a main body control section 31 gives each section a direction to read the document. Due to the foregoing, the document information, which is photoelectrically converted by a CCD 21 of a scanner section 20, is converted into digital image data by an A/D converter 22, and then, this image data is given to an image processing section 23. Then, after each kind of image processing has been conducted in an image processing section 23, the image data is sent to a writing section as writing data.

As an image processing operation in the image processing section 23, it is necessary, in some cases, that an area of the document is specified, and only the specified area is processed. In this case, end points of the area to be processed are pressed by an elastic body from above the document. Due to the foregoing, as shown in FIG. 2 and FIG. 3, since the SAW is attenuated in the pressed point, coordinates of the pressed point can be detected by the XYZ-axes detection circuit 13. Coordinate data of the pressed point thus obtained is given to the image processing section 23 through a CPU 15, and the main body control section 31. Then, in the image processing section 23, image processing operations directed from the operation panel according to coordinate data of the pressed point, are carried out with respect to the specified area. The following processing are used to process the image in the specified area: monochromatic reversal processing to reverse white and black in a monochromatic image; halftoning processing to conduct halftoning; trimming processing to output an image only in the specified area; masking processing to delete an image in the specified area; density conversion processing to convert density; partial color conversion processing to convert a color at the time of multi-color copying; magnification/reduction processing to magnify/reduce; and image shifting to shift the output position of an image.

In practice, the processing area is specified in the manner that the document surface is faced upward on the ultrasonic panel 11, and in the image reading operation, the image is read in the manner that the document surface is faced downward. In this case, the CPU 15 or the main body control section 31 gives coordinate data of the pressed point to the image processing section 23 after coordinates have been converted corresponding to the direction in which the document is reversed.

Figure 4:
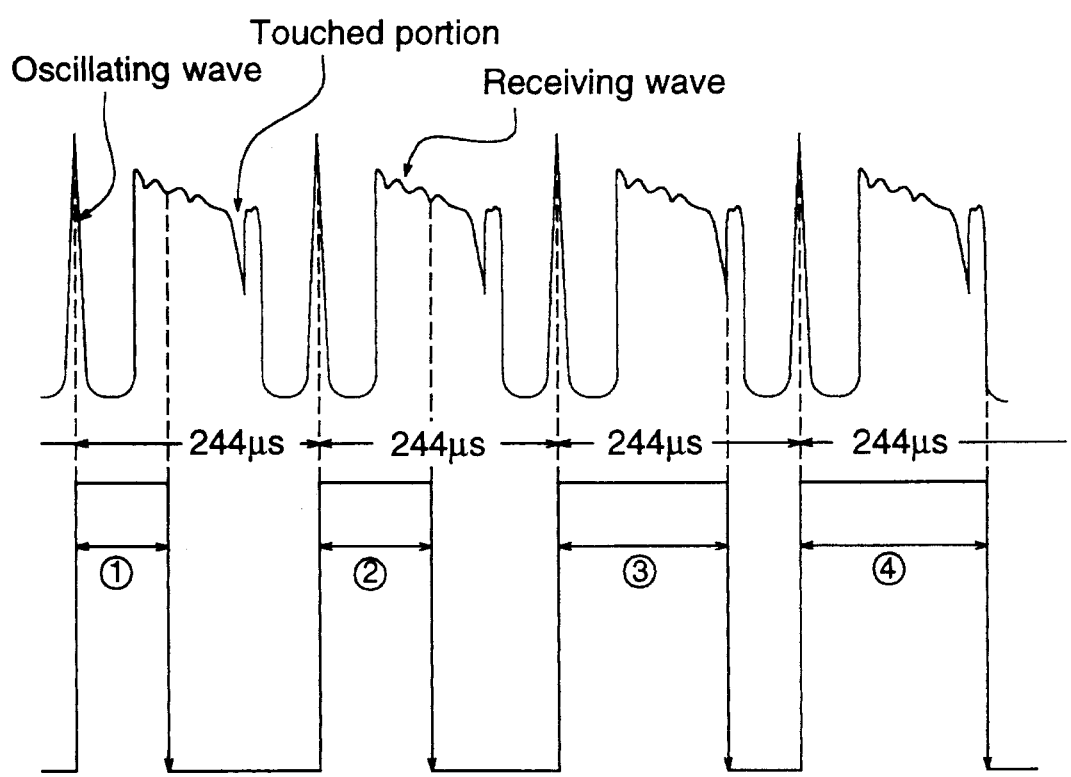
FIG. 4 is a waveform view explaining operations of the first embodiment of the present invention.

The propagation speed of the SAW is varied due to temperature changes, and therefore, t, t0, and t1 shown in FIG. 3 are varied. Thereby, it is difficult that coordinates of the pressed point are accurately detected. However, the relative position of the recessed portion b in the receiving waveform B is not changed. In this case, when a plurality of pulses are used, in which duty ratios are different from each other by a predetermined ratio in a period of time t1, and waveforms of these pulses are identical with the waveform of the recessed portion of the receiving pulse, accurate detection can be carried out. That is, when the number of pulses is counted until falling portions of pulses, duty ratios of which are different from each other, agree with the waveform of the recessed portion of the receiving pulse, data [the number of counted pulses/resolution] can be obtained. FIG. 4 is an illustration showing the foregoing condition. Here, four types of pulses ① to ④ are prepared, in which the time t1 to t is equally divided into four and duty ratios are successively shifted. Then, coincidence of a trailing edge of each pulse with the recessed portion b of the waveform B is detected. As shown in FIG. 4, the trailing edge of the third pulse ③ coincides with the recessed portion b. Thereby, it can be found that a three-quarter position viewed from the oscillator side has been pressed. In this example, the pressed position is detected at every unit of a quarter of the distance from the oscillator side. When it is desired to more precisely detect the pressed position, the number of time division may be increased in accordance with accuracy of the detection. Here, four kinds of pulses, in which the time t1 to t is divided into four equal times, are used for detecting the pressed point, and thereby, it can be found that a position at a three-quarter viewed from the oscillator side is pressed.

The XYZ-axes detecting circuit 13 can detect the pressing force (data in the direction of the Z-axis) from the recessed waveform of the receiving pulse. For this purpose, a plurality of threshold levels are used, and data in the direction of the Z-axis is obtained from the threshold level by which the waveform is crossed. The XYZ-axes detecting circuit is structured to detect the pressing force on the Z-axis, but the pressing point is not detected when an operator's hand even lightly comes into contact with the panel. When the image input apparatus is structured to inform users by a display using sound or light that the specified position has been detected by the pressing force, specifying can be properly carried out.

When the ultrasonic panel 11 is used as a platen glass, the pressing point is detected, and the editor function is realized as described above, the image input apparatus provides excellent resolution, durability, detectability, and operability. Further, in the case of a resistance film type touch panel, the resolution of the position detection is limited because a spacer is used to separate a contact point at the time of non-pressing, however, the present invention is not restricted by this limitation. Further, because the platen itself is used for specifying the position, special units such as a contact point in the case of the resistance film type touch panel, and a conductive thin film in the case of an electrostatic capacitance type touch panel, are not required at portions which are used every time the areas are specified. Therefore, durability is increased.

Detection can be carried out in the direction of the Z-axis, that is, a pressing force of the Z-axis direction can be detected. Therefore, misoperations can be prevented, and processing corresponding to the pressing force can be performed, so that detectability can be increased.

Further, an area can be specified under the condition that a document is placed on the platen. When an ADF is provided, the operability can be increased.

Next, the second embodiment of the present invention will be described as follows.

Figure 5:
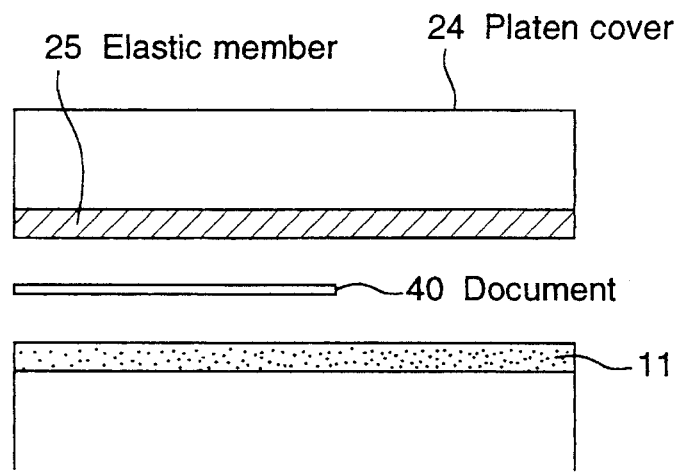
FIG. 5 is an illustration explaining operations of the second embodiment of the present invention.

FIG. 5 is a view showing the structure of the second example. In this embodiment, the ultrasonic touch panel is used for detecting the size of the document. In the embodiment shown in FIG. 5, an elastic material 25 is stuck on the entire surface of a document contacting surface side of a platen cover 24. Due to the foregoing, it is difficult for the document 40 to absorb the SAW, but the SAW is easily absorbed by the elastic material 25, so that the end position of the document can be detected. Due to the foregoing, the size of the document 40 can be detected. In the conventional image input apparatus, pre-scanning is conducted so that the size of the document can be optically detected. However, in this embodiment, the size of the document can be detected only when the platen cover is in place, so that pre-scanning is not necessary.

Figure 6:
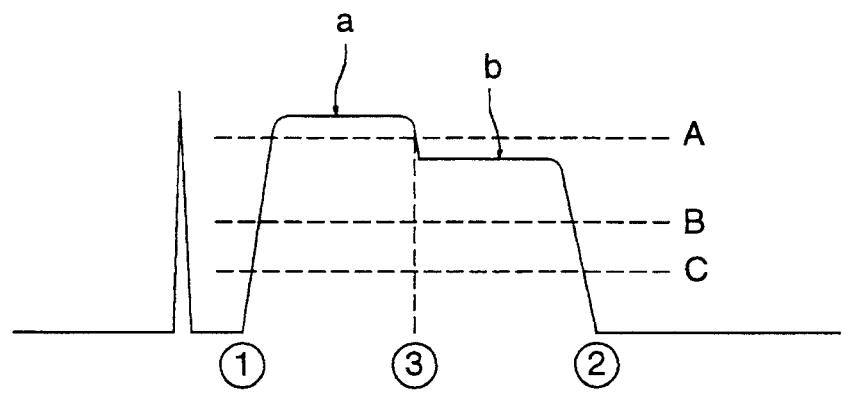
FIG. 6 is a waveform view explaining operations of the second embodiment of the present invention.

FIG. 6 shows the waveform of the ultrasonic receiving pulse as a function of time. A portion 'b' in which the amplitude of the receiving pulse is lowered in FIG. 6 corresponds to attenuation of the SAW caused by the elastic body 25. Accordingly, the size of the document can be detected by the CPU 15 or the main body control section 31 from the ratio of 'a' and 'b'. In this case, a plurality of threshold levels (A, B, C) are used for checking a point in which the receiving pulse crosses the threshold level. In the drawing, marks ① and ② correspond to end portions of the ultrasonic touch panel 11, and the coordinates of a mark ③ correspond to an end portion of the document.

Further, when the document size is detected, the existence of the document on the platen glass can be detected. That is, the existence of the document on the platen glass can be checked when the main body control section 31 detects the waveform of the ultrasonic receiving pulse at a point in time when the automatic document feeding operation is started.

Figure 7:
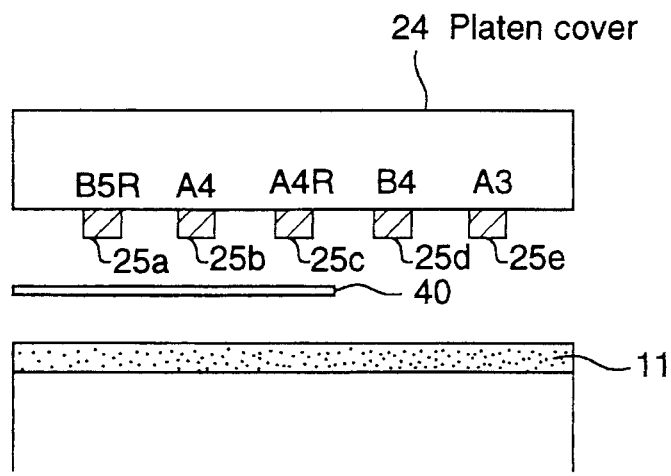
FIG. 7 ms an illustration explaining operations of the second embodiment of the present invention.

FIG. 7 is an illustration showing another example of the structure of the platen cover 24 which is appropriate for document size detection. In the drawing, elastic bodies 25a to 25e are linearly formed. Elastic bodies are respectively stuck to the platen cover 24 on an area larger than the sizes (B5R, A4, A4R, B4, A3) of sheets. When the size of the document 40 shown in FIG. 7 is B4, for example, the elastic body 25d which is provided outside of the document contacts with the platen glass 11a, so that the SAW is absorbed. In this case, as compared with the elastic body 25, which is stuck to the entire surface of the platen glass, shown in FIG. 5, the contact pressure to the platen glass 11 is increased, so that the document size can be easily detected, which is advantageous.

Figure 8:
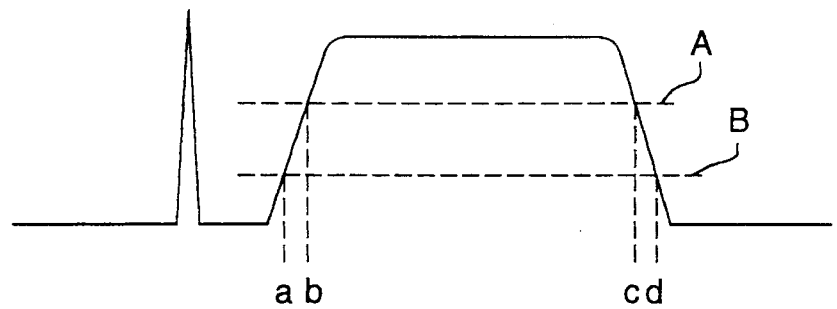
FIG. 8 is an illustration explaining operations of the second embodiment of the present invention.

FIG. 8 is a view showing a waveform of the receiving pulse of the ultrasonic wave in the case where the document is placed on the platen in a shelved position. In this case, since an end portion of the document is skewed, a portion in which the elastic body 25 is contacted with the ultrasonic touch panel 11 is not parallel with the advancing direction of the SAW. In order to detect the foregoing condition, a plurality of threshold levels (A, and B) are set, and the distance ('a' to 'b', and 'c' to 'd') between coordinates of points at which the waveform is crossed by the threshold levels, is obtained by the main body control section 31, so that the skewed sheet can be detected. Further, the skewed condition can be detected when the distance from the maximum value to the minimum value of the receiving pulse (or the number of elastic bodies with which the document is contacted) is detected by the main body control section 31. As described above, the main body control section 31 by which the skew of the document is detected, displays a predetermined alarm on a display section in the operation panel 36. Although a document size detection using an elastic body of the platen cover is described above, when an elastic portion of the document feeding means (for example, an elastic portion of the ADF belt) is used, the document size detection can be carried out in the manner described above.

Figure 9:
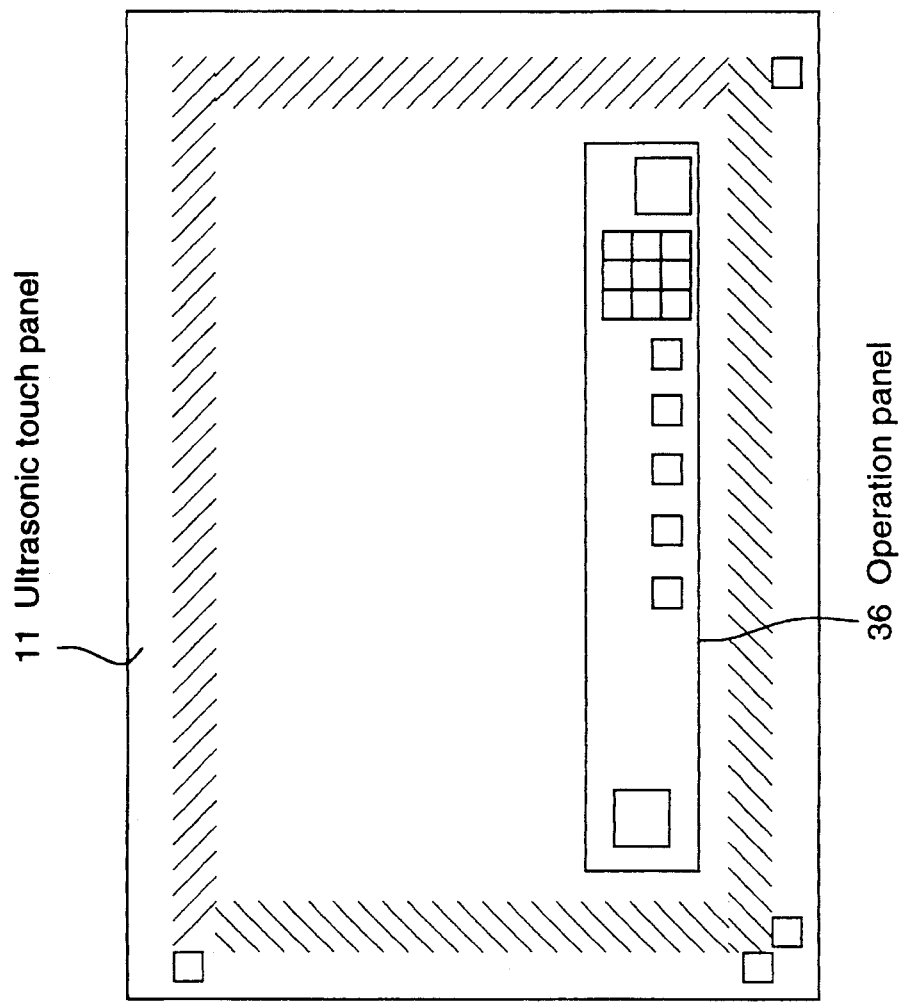
FIG. 9 is an illustration explaining operations of the third embodiment of the present invention.

FIG. 9 is an illustration showing an operation panel formed on a portion of the ultrasonic touch panel. In this embodiment, the ultrasonic touch panel is larger than that of the foregoing embodiments, and an operation panel 36 which can be used for operation switches is formed on the end portion of the panel. In this case, the XYZ-axes detection circuit 13 detects that an operator has touched a predetermined position on the platen glass. The main body control section 31 switches operation modes in response to an input from the XYZ-axes detection circuit 13, and control is conducted. When an operator touches a predetermined position on the platen glass, the conventional operation of switches takes place.

When one of the switches of the operation panel 36 is pressed, the main body control section 31 can control operations by referring to the pressing force (data in the direction of Z-axis). For example, when magnification data is input, variation (Δ%/sec) of the magnification data is changed corresponding to a magnitude of the pressing force.

Conventionally, variation of a magnification ratio is increased when a switch is pressed for period of time. In that case, the magnification ratio is slowly changed initially but variation is increased after a predetermined period of time, and therefore, it is difficult to select desired data. Conversely, when variation of data is changed corresponding to the magnitude of the pressing force, operators can reduce the pressing force near the desired data so that variation of data is decreased, and thereby, data such as a magnification ratio or the like can be easily selected. The operation modes can be used not only for input of magnification data, but also for input of various kinds of data.

As explained in detail in the foregoing, when the ultrasonic touch panel is used for the platen glass, an image input apparatus has excellent operability.

In the foregoing, although an embodiment of a digital apparatus has been described, an analog apparatus can be used also for the same purpose. For example, when multi-chip LEDs are arranged on a drum surface for an erasable LED, masking/trimming operations can be easily carried out by ON/OFF of the LEDs.

As described in detail in the foregoing, in the present invention, a plurality of reflection slits and ultrasonic oscillators are provided at the end portion of the platen glass, the surface acoustic wave is propagated in the directions of X-axis and Y-axis, and a position of a pressed point is detected by using absorption of the surface acoustic wave, and therefore, designation of a point by an editor can be easily carried out at the time of the image input.

Further, the condition of document placement can be easily detected depending on the degree of absorption of the surface acoustic wave, so that document feeding operations can be switched. Further, when the pressure of a predetermined position on the platen glass is detected, the platen glass can be used for operation switches, and operation modes of the image input apparatus can be switched.

What is claimed is:

1. An image reading apparatus for inputting image data corresponding to an image on a document, comprising:

means having a transparent body for supporting the document;

means for scanning the image of said document through said transparent body of said supporting means;

a plurality of reflection slits provided outside an effective image reading area on said supporting means;

means for generating an oscillation signal toward said plurality of reflection slits;

means for receiving said oscillation signal which has been reflected by said plurality of reflection slits, and generating a receiving signal; and means for determining a location of said document according to said receiving signal, and generating a positioning signal which designates the location of said document.

2. The image reading apparatus of claim 1, wherein the oscillation signal is an ultrasonic wave.

3. The image reading apparatus of claim 1, further comprising:

means for recognizing an occurrence of said document on said supporting means according to said positioning signal, and generating an occurrence signal.

4. The image reading apparatus of claim 3, further comprising:

means for displaying the occurrence of said document according to said occurrence signal.

5. The apparatus of claim 1, further comprising:

a cover member for covering said document on said supporting means;

means for detecting a contact of said cover member with said support means according to said receiving signal, and generating a detection signal; and means for determining a size of said document according to said detecting signal.

6. An input apparatus for inputting image editing information corresponding to an image on a document, comprising:

means having a transparent body for supporting the document;

means for scanning the image of said document through said transparent body of said supporting means;

means on said transparent body of said supporting means for inputting the image editing information corresponding to said image by pressing said transparent body, said inputting means including:

means for detecting a location indicated by an operator, said location detecting means including:

a plurality of reflection slits provided outside an effective image reading area on said supporting means, means for generating an oscillation signal toward said plurality of reflection slits, means for receiving said oscillation signal which has been reflected by said plurality of reflection slits, and generating a receiving signal, and means for determining said indicated location according to said receiving signal, and generating a positioning signal which designates the location indicated by the operator, and means for detecting a pressing force of an indication of said location by the operator; and means for determining the pressing force detected by said pressing force detecting means, and generating a pressing force signal which designates the pressing force indicated by the operator.

7. The input apparatus of claim 6, wherein the oscillation signal is an ultrasonic wave.

8. The input apparatus of claim 6, further comprising:

image data processing means for processing image data read by said scanning means according to said positioning signal.

9. The input apparatus of claim 8, further comprising:

image forming means for forming an image on a sheet according to said image data processed by said image data processing means.

10. The input apparatus of claim 6, further comprising:

image forming means for forming an image on a sheet according to said positioning signal.

* * * * *